(12) United States Patent
Lee et al.

(10) Patent No.: US 8,525,792 B1
(45) Date of Patent: Sep. 3, 2013

(54) ADJUSTABLE KEYBOARD OR TOUCH SCREEN IN A HANDHELD DEVICE

(75) Inventors: Woo Jae Lee, Manhattan, KS (US);
Sanjay K. Sharma, Olathe, KS (US);
Srinivasan Balaji Thenthiruperai,
Prairie Village, KS (US); **Peter S.
Syromiatnikov**, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1685 days.

(21) Appl. No.: 11/935,771

(22) Filed: Nov. 6, 2007

(51) Int. Cl.
*G09G 5/08* (2006.01)

(52) U.S. Cl.
USPC .............................. 345/168; 345/173; 345/179

(58) Field of Classification Search
USPC .......................................... 345/168, 173, 179
See application file for complete search history.

(56) References Cited

U.S. PATENT DOCUMENTS

| 5,949,348 | A | * | 9/1999 | Kapp et al. | 340/5.4 |
| 7,705,829 | B1 | * | 4/2010 | Plotnikov | 345/168 |
| 7,800,592 | B2 | * | 9/2010 | Kerr et al. | 345/173 |
| 2006/0007178 | A1 | * | 1/2006 | Davis | 345/173 |
| 2010/0231522 | A1 | * | 9/2010 | Li | 345/169 |

* cited by examiner

*Primary Examiner* — William Boddie
*Assistant Examiner* — Leonid Shapiro

(57) ABSTRACT

Systems are provided for adjusting a keyboard or a touch screen in a handheld device. A user may configure the handheld device to automatically shift to a pre-determined location in the handheld device. The handheld device may implement software that records keystrokes. Based on the majority of keystrokes determined from each hand, the keyboard may shift to the hand with the majority of keystrokes. The handheld device may implement a sensory mechanism that records touches on the handheld device. Based on the touches, the keyboard in the handheld device may shift to or away from the hand touching the handheld device or the hand recording the majority of touches on the handheld device.

18 Claims, 7 Drawing Sheets

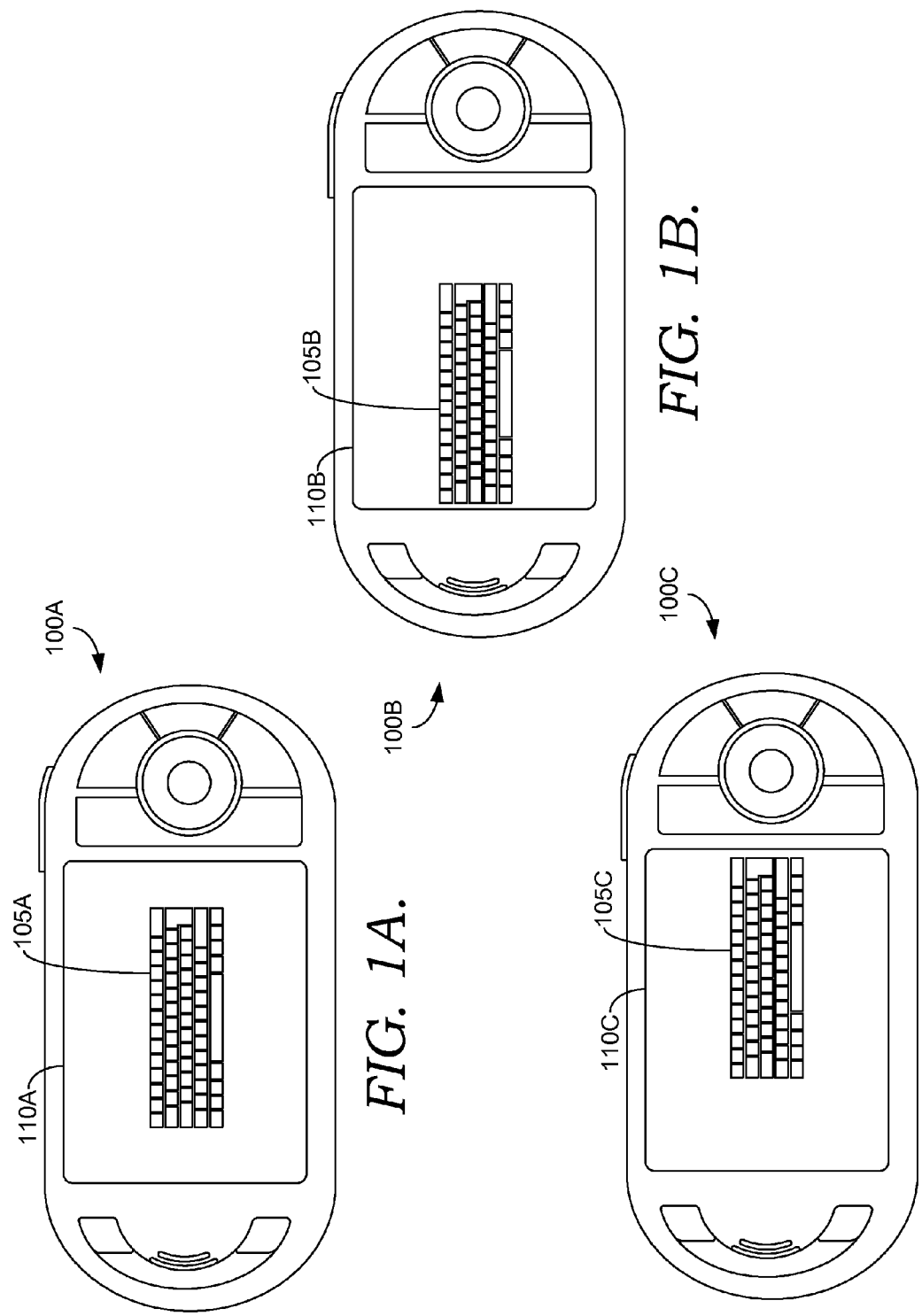

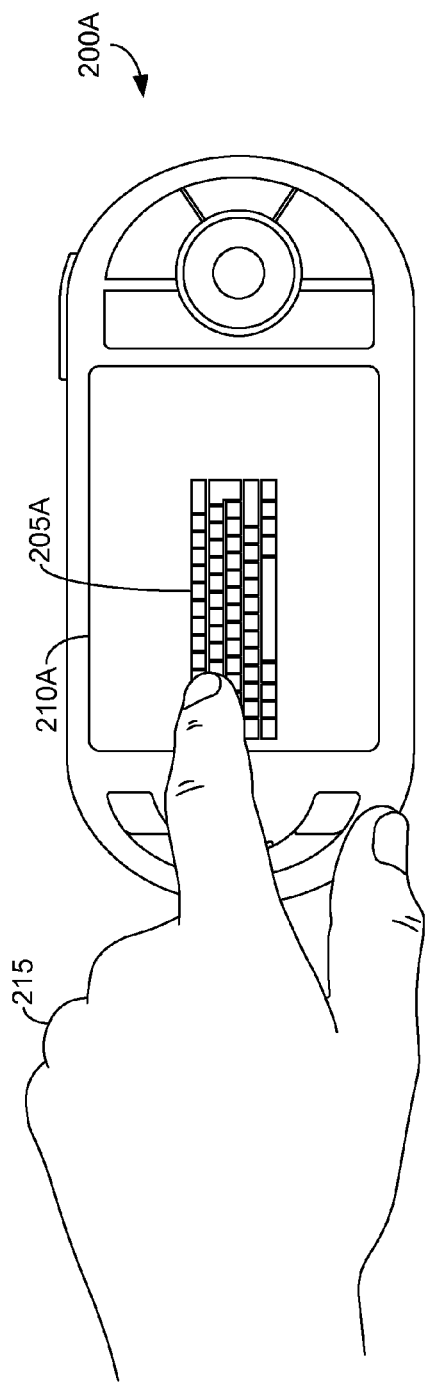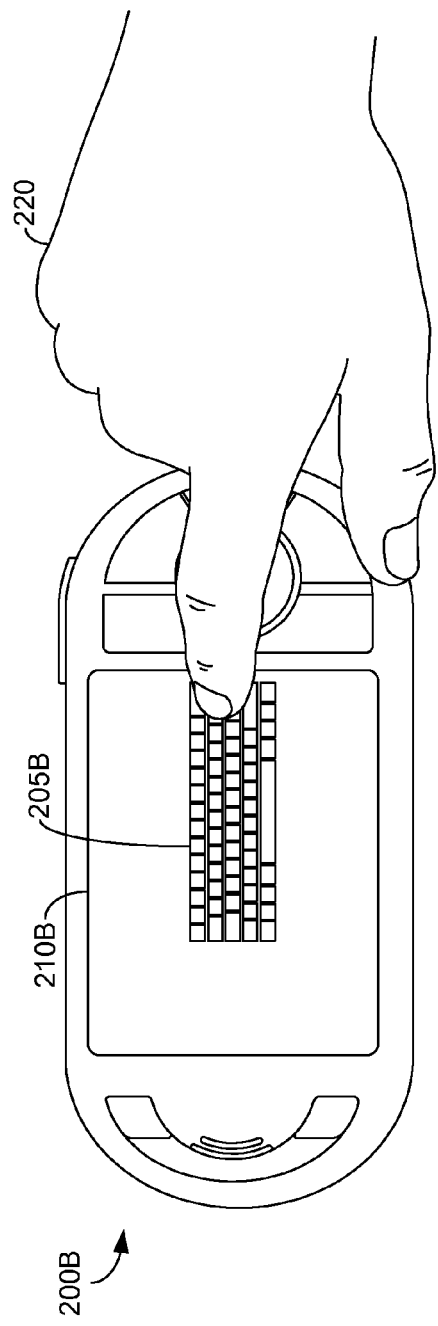

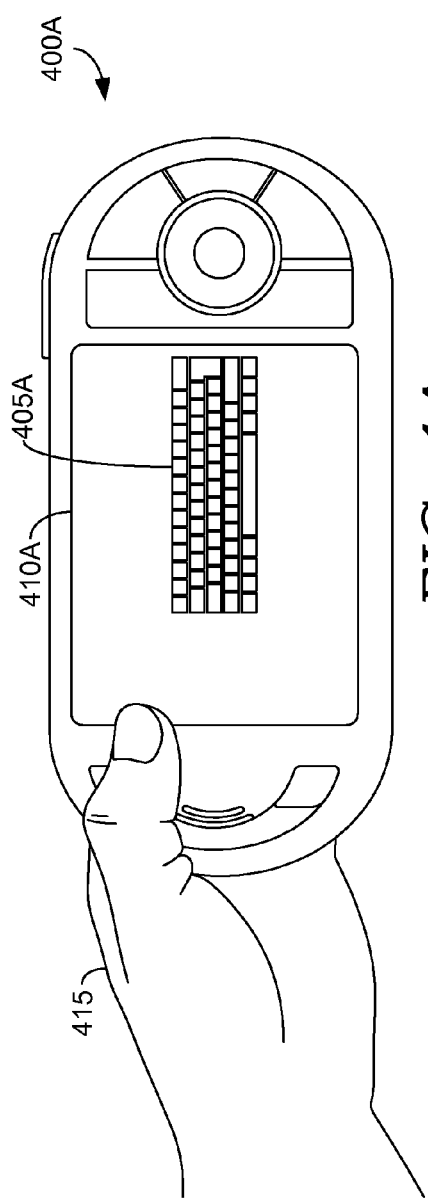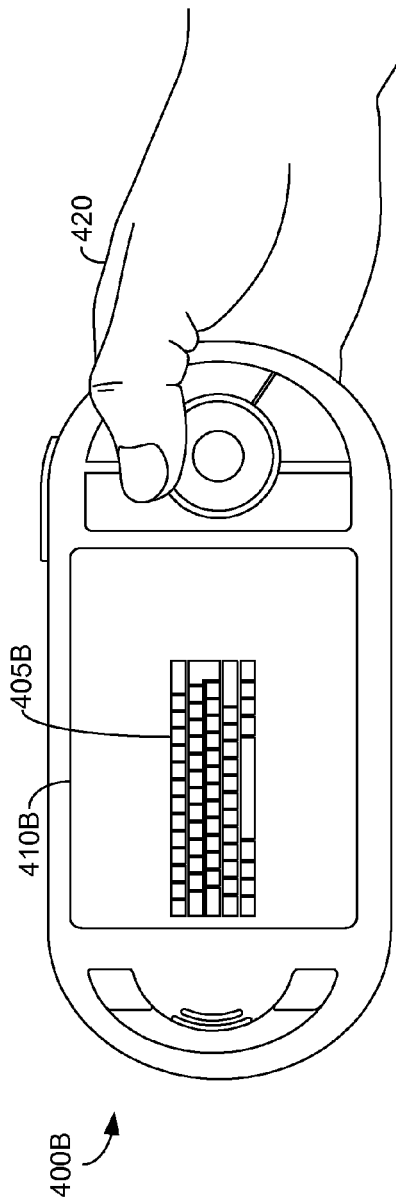

US 8,525,792 B1

ADJUSTABLE KEYBOARD OR TOUCH SCREEN IN A HANDHELD DEVICE

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention is defined by the claims below. Embodiments of the present invention solve a problem by providing systems for, among other things, adjusting a keyboard or touch screen in a handheld device.

In a first aspect, a computer system having a processor and a memory for executing a method for adjusting a virtual keypad in a handheld device to a preferential use of a user is provided that includes selecting a configuration in the handheld device associated with a location of the virtual keypad. The location of the virtual keypad in a display of the handheld device is changed based on the configuration selected in the handheld device. The handheld device is operated with the virtual keypad. The virtual keypad is in the location that is changed.

In another aspect, a computer system having a processor and a memory for executing a method for dynamically changing a location of a layout in a touch screen in a handheld device is provided that includes holding the handheld device with at least a left hand, a right hand, or two hands. Keys are pressed on the layout in the touch screen with the left hand, the right hand, or the two hands. A majority of keystrokes is determined over an interval from either the left hand or the right hand. The layout in the touch screen is shifted towards a hand with the majority of keystrokes.

In yet another aspect, a computer system having a processor and a memory for executing a method for dynamically changing a location of a layout in a touch screen in a handheld device based on a sensory touch of the handheld device is provided that includes holding the handheld device with at least a left hand, a right hand, or two hands. Sensory touches of the handheld device are detected from the left hand, the right hand, or the two hands. A location of the layout in the touch screen in a display of the handheld device is changed based on the sensory touches. The layout is a keyboard.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIGS. 1A, 1B, and 1C are perspective views of a handheld device with a keyboard, illustrating an implementation of an embodiment of the present invention;

FIGS. 2A and 2B are illustrations of perspective views of a user typing on a keyboard in a handheld device during an implementation of an embodiment of the present invention;

FIGS. 4A and 4B are alternate illustrations of perspective views of a user holding a handheld device and affecting the location of the keyboard during an implementation of an embodiment of the present invention;

DETAILED DESCRIPTION

Figure 3A:
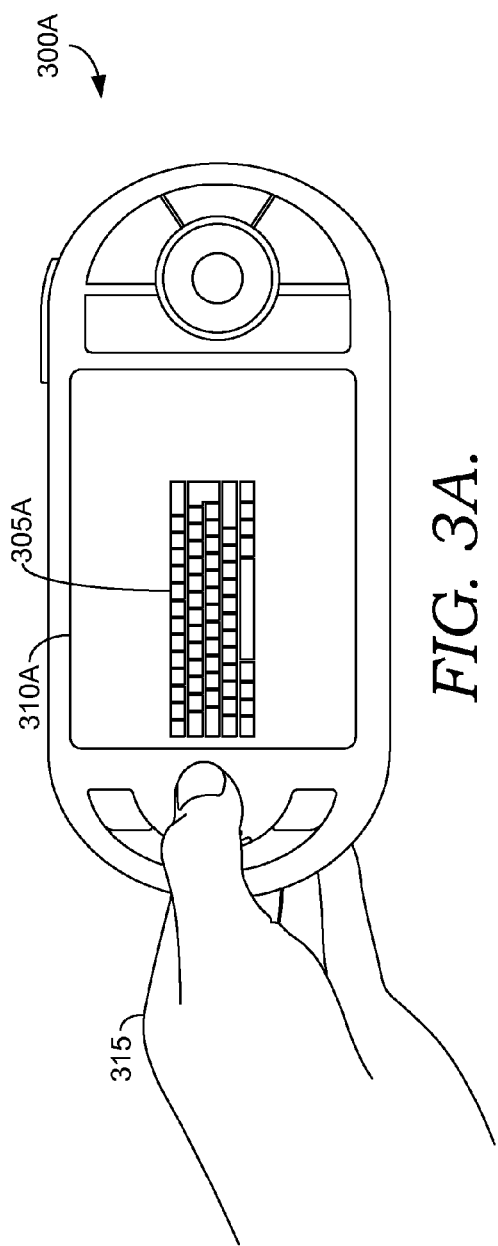
FIGS. 3A and 3B are illustrations of perspective views of a user holding a handheld device and affecting the location of the keyboard during an implementation of an embodiment of the present invention.

Embodiments of the present invention provide systems for adjusting a keyboard or touch screen in a handheld device.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disc-Read Only Memory |
| EEPROM | Electrically Erasable Programmable Read-Only Memory |
| LCD | Liquid Crystal Display |
| PDA | Personal Digital Assistant |
| RAM | Random Access Memory |
| ROM | Read-Only Memory |

Further, various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Adjustable Keyboard or Touch Screen

Embodiments of the present invention enable a user to operate a handheld device with more ease during the typing of input of information. Embodiments of the present invention allow the keyboard or keypad of the handheld device to be modified to enable an ease of use for the user. The keyboard or keypad may be shifted to various positions to allow the user to access the keyboard or keypad more easily. Keys or buttons associated with the keyboard or keypad may change position or be removed altogether. Some keys or buttons may be visually enlarged to ergonomically assist the user.

In FIG. 1A, a handheld device 100A is shown with a keyboard 105A located in a display 110A. Device 100A can be described as a mobile device such as a PDA, mobile phone, smartphone, wireless device, or data entry device. Device 100A can be gripped or held by a user. It can also be placed on a surface. Whether gripped, held, or placed on the surface, device 100A may be operated by the user.

Keyboard 105A is a typical keyboard shown embedded in display 110A. In an embodiment, keyboard 105A may exist as an LCD layout in display 110A. The internal workings for display 110A can cause lines to appear that form keyboard 105A. Although in FIG. 1A keyboard 105A is shown in display 110A, in another embodiment, keyboard 105A can exist with physical keypads embedded in device 100A.

Display 110A exists to allow the user to provide input into device 100A. Display 110A can also convey output to the user. In one embodiment, display 110A may be divided into sections with one section containing keyboard 105A for input and the other section providing a display area for output. In another embodiment, display 110A may exist with a physical keyboard 105A. Therefore, device 100A with display 110A can exist in various forms other than the one depicted in FIG. 1A.

FIGS. 1B and 1C illustrate perspective views of a handheld device whose components are identical to device 100A depicted in FIG. 1A. FIGS. 1B and 1C illustrate a situation where a user of device 100A in FIG. 1A configures the device to operate a certain way. In an implementation of an embodiment in FIG. 1B, the user may configure a device 100B to shift a keyboard 105B to the left in a display 110B. In another implementation of an embodiment in FIG. 1C, the user may configure a device 100C to shift a keyboard 105C to the right in a display 110C. FIGS. 1A, 1B, and 1C illustrate that a keyboard may be configured to move around a display. Although the keyboard is illustrated in FIGS. 1A, 1B, and 1C in a center, left-shifted, and right-shifted positions, the device can be configured to display the keyboard in a vertical position. An implementer of the present invention can establish how the device is configured as well as determine the results of the configuration in the display of the device. For example, the configuration can be based on a substantially left-handed typist, a substantially right-handed typist, or a substantially two-handed or even-handed typist. Furthermore, the configuration can implement changes to the keyboard to aid the user. For example, the configuration can cause one key of a set of duplicated keys to be removed when the keyboard is shifted. In another example, the configuration can cause a key to enlarge to aid the user. In yet another example, the configuration can cause a key to change positions, such as the CTRL, SHIFT, or ALT key moving to another position.

Now turning to FIGS. 2A and 2B, illustrations are shown of perspective views of a user typing on a keyboard in handheld devices 200A and 200B during an implementation of an embodiment of the present invention. FIGS. 2A and 2B are similar to FIGS. 1A, 1B, and 1C illustrating the same components. FIGS. 2A and 2B are similar to FIGS. 1B and 1C in that devices 200A and 200B can implement a configuration scheme like the devices in FIGS. 1A, 1B, and 1C. As shown, keyboards 205A and 205B are shifted to aid the user. However, in an implementation of an embodiment of the present invention, devices 200A and 200B can implement software that detects a majority of keystrokes made by the user's hands. The keystrokes can be recorded over an interval from either hand. Based on the majority of keystrokes from a particular hand, the keyboard shifts towards the hand with the majority of keystrokes. For example, if the user's left hand makes the majority of keystrokes over a time interval, the keyboard shifts left. As shown in FIG. 2A, a hand 215 makes the majority of keystrokes on keyboard 205A in display 210A. Therefore, keyboard 205A is shifted left in device 200A. If the user's right hand makes the majority of keystrokes over time interval, the keyboard shifts right. As shown in FIG. 2B, a hand 220 makes the majority of keystrokes on keyboard 205B in display 210B. Therefore, keyboard 205B is shifted right in device 200B.

In an implementation of an embodiment of the present invention, the time interval to record the keystrokes may vary according to desires of the implementer. Furthermore, the shifting of the keyboard is dynamic in that over various intervals, the keyboard may shift in different directions depending on the recording of the majority of keystrokes. The implementer has to consider how often the keyboard may shift and may implement a time interval that records the majority of keystrokes but minimizes how often a keyboard may shift. For example, the time interval may be set for a few seconds or as long as a few minutes. Therefore, rather than initially configuring the device to shift the keyboard, software on the device can operate to dynamically shift the keyboard based on the recorded keystrokes over a set time interval.

In determining how the majority of keystrokes are counted, an implementer of an embodiment of the present invention may consider how the keystrokes are recorded. When a keystroke is recorded, a determination has to be made whether the keystroke came from the left hand or the right hand. In one aspect, a detection is made of either a contact between a finger and a key or a contact between a thumb and the key. This detection is recorded as a keystroke in the software on the device. In an addition, the keystroke is registered as being from the left hand if the contact is substantially to a left side of the key. The keystroke is registered as being from the right hand if the contact is substantially to a right side of the key. Furthermore, the keystroke can be registered by an angular pressure detected against the key from the finger with the key or from the thumb with the key.

Figure 3B:
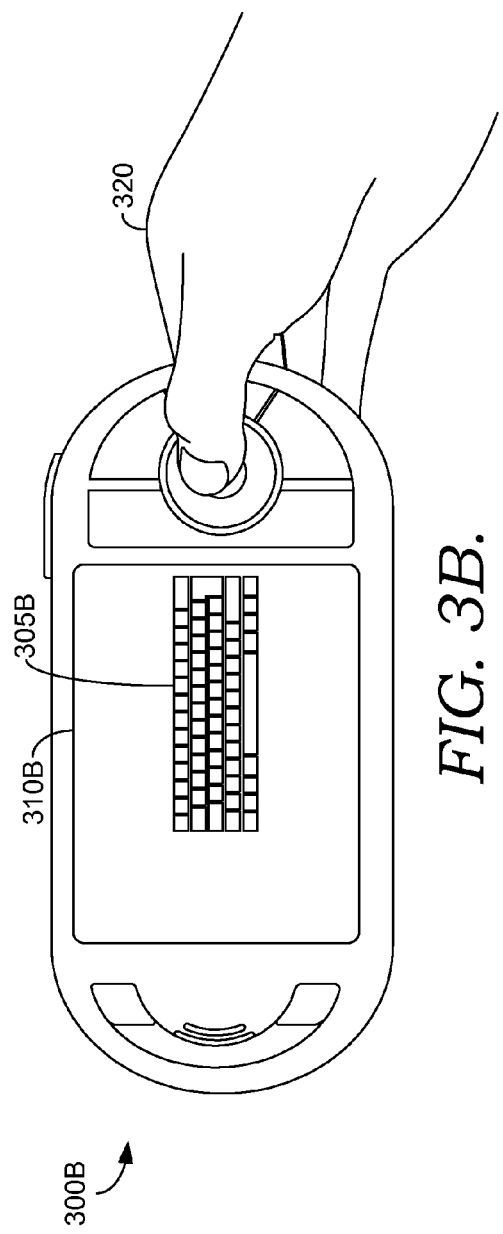

In FIGS. 3A and 3B, illustrations are shown of hands 315 and 320 respectively holding devices 300A and 300B. Devices 300A and 300B are same as the devices described in the previous figures. However, rather than pre-configure the devices or use keystrokes to determine the location of the keyboard, devices 300A and 300B implement a sensory mechanism that changes the location of keyboards 305A and 305B in displays 310A and 310B based on touch. In an implementation of an embodiment in FIG. 3A, a hand 315 holds device 300A. By touching device 300A with hand 315, keyboard 305A shifts to the left in display 310A. In FIG. 3B, a hand 320 holds device 300B. By touching device 300B with hand 320, keyboard 305B shifts to the right in display 310B. Although not shown in FIGS. 3A and 3B, devices 300A and 300B contain a plurality of sensory components that detect when and how the user is holding the device.

FIGS. 3A and 3B are indicative of the user that holds a handheld device in one hand and also uses the thumb in the same hand to type on the display. Although this is cumbersome, some users can hold a device and type in this manner.

Now turning to FIGS. 4A and 4B, devices 400A and 400B are similar to devices 300A and 300B. Devices 400A and 400B implement the same or similar embodiment as the one described in FIGS. 3A and 3B. When a hand 415 holds device 400A, a keyboard 405A shifts to the right in a display 410A. When a hand 420 holds device 400B, a keyboard 405B shifts to the left in a display 410B.

FIGS. 4A and 4B are indicative of the user that holds a handheld device in one hand and types on the keyboard with the other hand. Typically, the user may use this approach to typing on the device and the shifting of the keyboard aids the user by bringing the keyboard closer to the hand that will do the typing.

Contrast the location of keyboards 305A and 305B in FIGS. 3A and 3B with keyboards 405A and 405B in FIGS. 4A and 4B. In one set of figures, the keyboards shift to the side closest to the hand holding the device. In the other set of figures, the keyboards shift to the side opposite of the hand holding the device. An implementer of an embodiment of the invention can include a configuration mechanism, similar to one discussed in the figures above, that allows the user to customize how the keyboard shall behave when the user holds the device. Furthermore, the implementer of an embodiment may incorporate an aspect similar to the discussion in FIGS. 2A and 2B. Rather than record a majority of keystrokes, the embodiment may record a majority of sensory touches from the hands on the device to determine if the keyboard should be shifted left or right, or remain centered.

Figure 5:
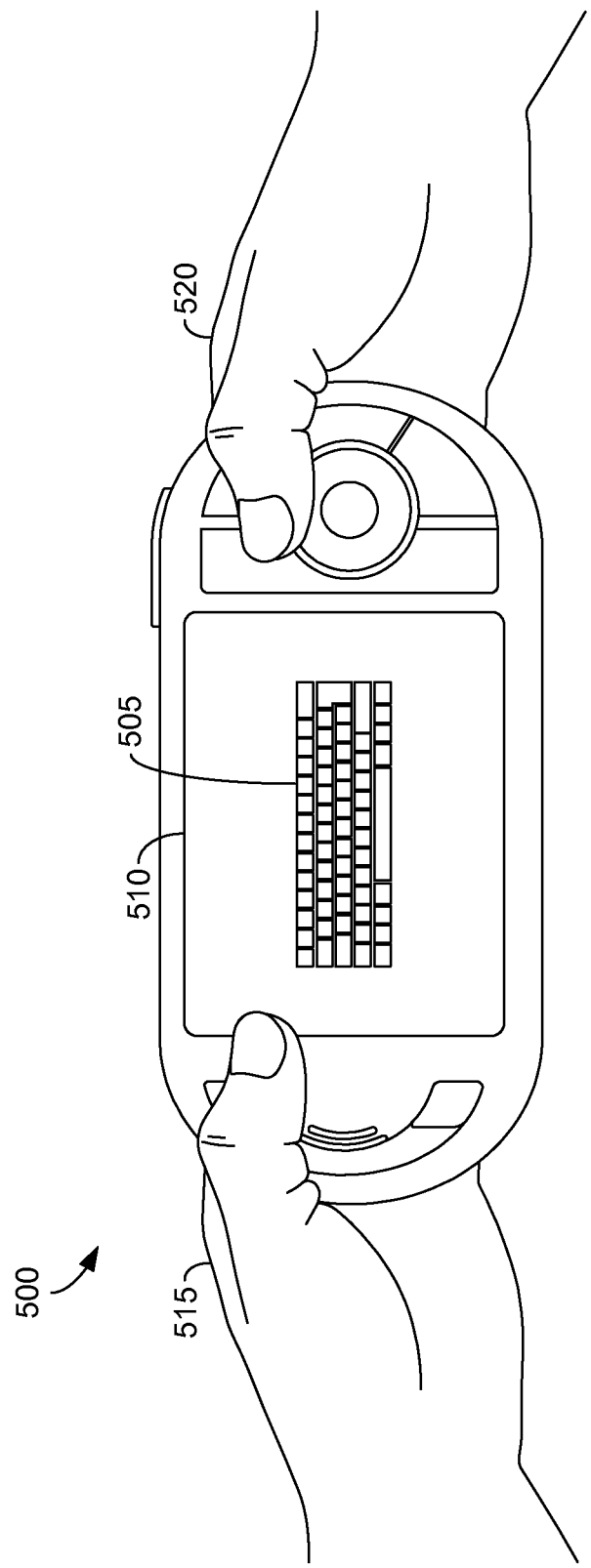
FIG. 5 is an illustration of a perspective view of a user holding a handheld device with both hands and affecting the location of the keyboard during an implementation of an embodiment of the present invention.

In FIG. 5, an illustration is shown of a user holding device 500 with both hands 515 and 520. As shown, a keyboard 505 is substantially centered in a display 510. Various embodiments may be implemented that result in keyboard 505 being located in display 510. In one embodiment, device 500 may be pre-configured by the user to have keyboard 505 remain in a center position. This embodiment is similar to the discussion of FIG. 1A. Regardless of the user's efforts, keyboard 505 remains in the center position. In another embodiment, keystrokes may be recorded over a time interval which result in an even distribution of keystrokes from either hand. Based on the even distribution of the keystrokes, keyboard 505 remains in the center position in display 510. This embodiment is similar to the discussion of FIGS. 2A and 2B. In yet another embodiment, device 500 may have a sensory mechanism that adjusts keyboard 505 according to a touch of device 500. With both hands 515 and 520 holding device 505, keyboard 505 remains in the center position in display 510 as opposed to being shifted to one side. This embodiment is similar to the discussion of FIGS. 3A, 3B, 4A, and 4B.

Typically, FIG. 5 is indicative of a user that types on device 500 with the thumbs. Since both hands 515 and 520 are holding device 500, the user can type with ease with both thumbs. As a result, it is desirable to have keyboard 505 remain in a centered position in display 510. However, in another implementation of an embodiment of the present invention, keyboard 505 may be shifted off-center in display 510 even while hands 515 and 520 hold device 500. This off-center shifting may occur to provide an equal distant reach for both hands 515 and 520 to keyboard 505. For example, as shown in FIG. 5., keyboard 505 may shift off-center to the right since a larger portion device 500 seems to be located to the right side making the reach of the right hand 520 more difficult to keyboard 505.

Figures 6, 7:
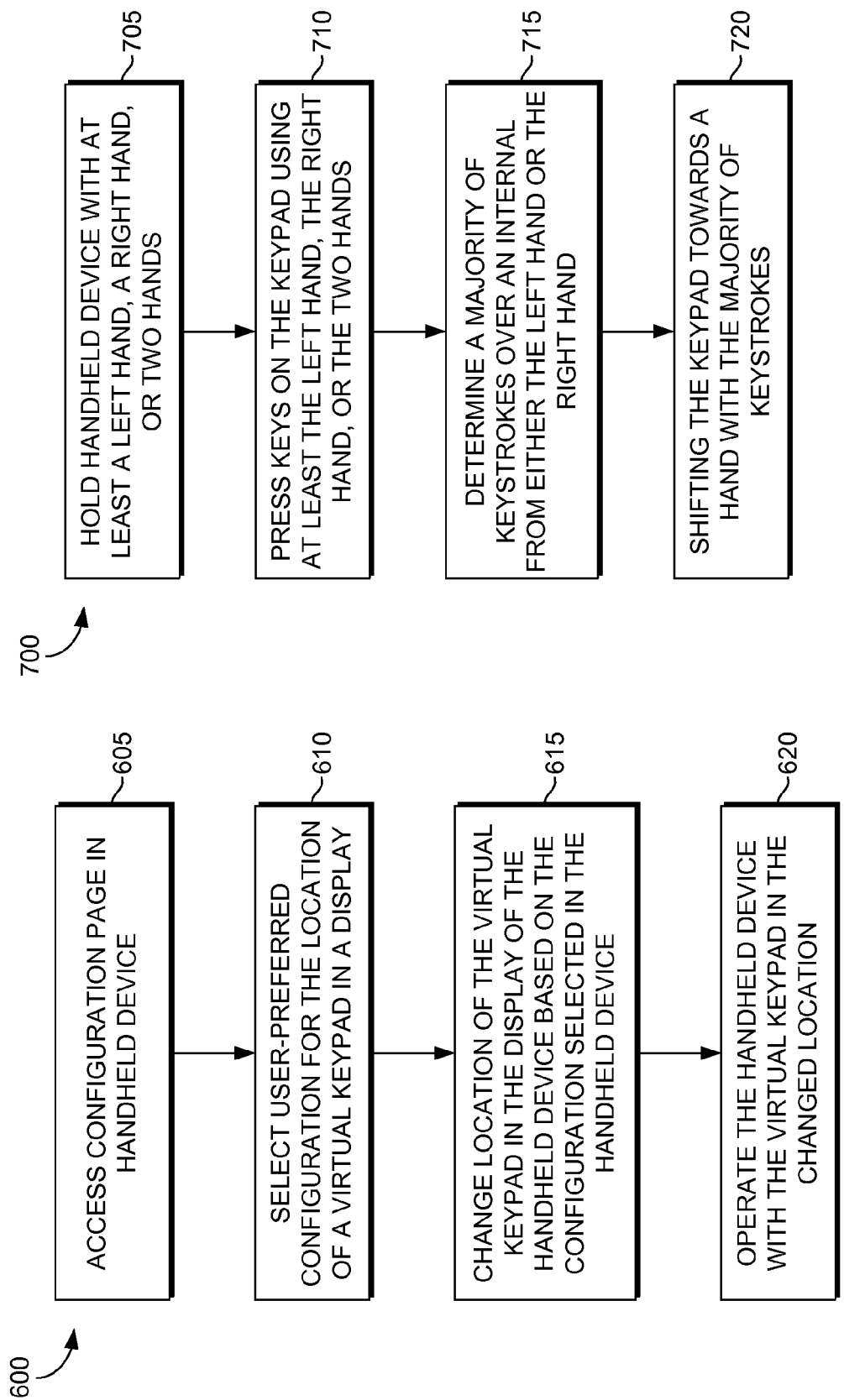
FIG. 6 is a flowchart of an exemplary process for adjusting a virtual keypad in a handheld device to a preferential use when implementing an embodiment of the present invention.
FIG. 7 is a flowchart of an exemplary process for dynamically changing a location of a keypad in a handheld device when implementing an embodiment of the present invention.

Turning now to FIG. 6, a process for adjusting a virtual keypad in a handheld device to a preferential use is shown in a method 600. In a step 605, the configuration page in device 100A is accessed. In a step 610, a user-preferred configuration is selected for the location of a virtual keypad such as keyboard 105A in display 110A. In a step 615, the location of the keyboard 105A is changed in display 110A based on the configuration selected in device 100A. This is shown in location of keyboard 105B in display 110B and keyboard 105C in display 110C. In a step 620, devices 100B and 100C are operated with keyboards 105B and 105C in the changed locations.

In FIG. 7, a process for dynamically changing a location of keypad in a handheld device is shown in a method 700. In a step 705, devices 200A and 200B are held with either the left hand, right hands, or both hands. In a step 710, keys on keyboards 205A and 205B are pressed using either the left hand, right hand, or both hands. In a step 715, a majority of keystrokes are determined over an interval from either the left hand or the right hand. In a step 720, keyboards 205A and 205B shift respectively towards hands 215 and 220 which provided the majority of the keystrokes on devices 200A and 200B.

Figure 8:
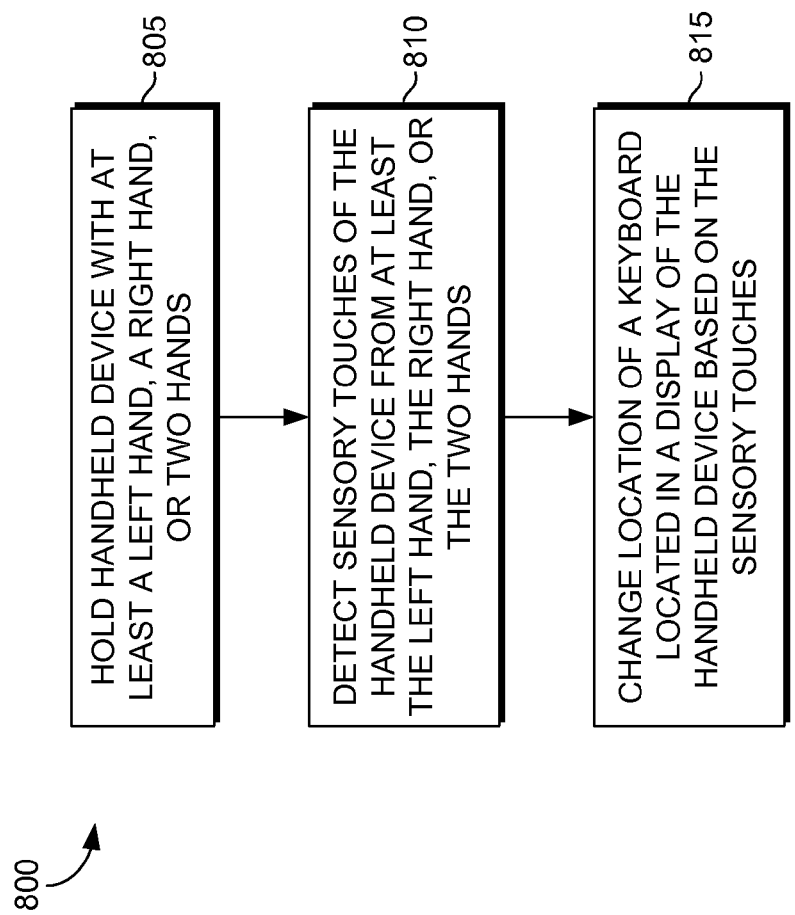
FIG. 8 is a flowchart of an exemplary process for dynamically changing a location of a keypad based on a sensory touch of a handheld device when implementing an embodiment of the present invention.

In FIG. 8, a process for dynamically changing a location of keypad based on a sensory touch of a handheld device is shown in a method 800. In a step 805, devices 300A and 400A are held with left hands 315 and 415. Devices 300B and 400B are held with right hands 320 and 420. Device 500 is held with both hands 515 and 520. In a step 810, sensory touches are detected at devices 300A, 300B, 400A, 400B, and 500. Devices 300A and 400A illustrate sensory touches made by left hands 315 and 415. Devices 300B and 400B illustrate sensory touches made by right hands 320 and 420. Device 500 illustrate sensory touches made by both hands 515 and 520. In a step 815, the location of the keyboards located in a display of the device is changed based on the sensory touches. Keyboards 305A and 405A shift to the left in displays 310A and 410A based on the sensory touches by left hands 315 and 415. Keyboards 305B and 405B shift to the right in displays 310B and 410B based on the sensory touches by right hands 320 and 420. Keyboard 505 remains in a centered position in display 510 based on the sensory touches of both hands 515 and 520.

The prior discussion is only for illustrative purposes to convey exemplary embodiments. The steps discussed in FIGS. 6-8 may be executed without regards to order. Some steps may be omitted and some steps may be executed at a different time than shown. For example, step 620 may be executed before step 610. Step 720 may be executed before step 715. Step 815 may be executed before step 810. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. A computer system having a processor and a memory for executing a method for dynamically changing a location of a layout in a touch screen in a handheld device, comprising:
   keystrokes,
   holding the handheld device with at least one of a left hand, a right hand, and two hands;
   pressing one or more keys on the layout in the touch screen with the at least one of the left hand, the right hand, and the two hands;
   comparing a number of keystrokes over an interval from the left hand or the right hand; and
   shifting the layout in the touch screen towards a hand with the majority of keystrokes.

2. The system of claim 1, further comprising updating the number of keystrokes.

3. The system of claim 2, further comprising shifting the layout in the touch screen towards the hand based on an updated number of keystrokes.

4. The system of claim 1, wherein the layout is a virtual keyboard located in a display of the handheld device.

5. The system of claim 4, further comprising removing one key of each duplicated key from the virtual keyboard.

6. The system of claim 4, further comprising at least one of enlarging the one or more keys to accommodate typing by a thumb and changing a position of a key in the virtual keyboard.

7. The system of claim 1, wherein comparing the number of keystrokes comprises detecting a contact between a finger or a thumb with the one or more keys wherein the contact from the left hand is substantially to a left side of a key and the contact from the right hand is substantially to a right side of the key.

8. The system of claim 7, wherein detecting the contact comprises detecting an angular pressure against the key from the finger or the thumb with the one or more keys.

9. A computer system having a processor and a memory for executing a method for dynamically changing a location of a layout in a touch screen in a handheld device based on a sensory touch of the handheld device, comprising:
   holding the handheld device with at least one of a left hand, a right hand, and two hands;
   detecting one or more sensory touches of the handheld device from the at least one of the left hand, the right hand, and the two hands; and
   changing a location of the layout in the touch screen in a display of the handheld device based on the one or more sensory touches wherein the layout is a keyboard.

10. The system of claim 9, further comprising at least one of removing one key of each duplicated key from the virtual keyboard, enlarging the one or more keys to accommodate typing by a thumb, and changing a position of a key in the virtual keyboard.

11. The system of claim 9, further comprising configuring the handheld device such that the keyboard shifts away from a hand that holds the handheld device and moves to a center position when the two hands hold the handheld device.

12. The system of claim 11, further comprising:
   holding the handheld device with the left hand and typing on the keyboard with the right hand;
   holding the handheld device with the right hand and typing on the keyboard with the left hand; or
   holding the handheld device with two hands and typing on the keyboard with two thumbs.

13. The system of claim 10, further comprising configuring the handheld device such that the keyboard shifts towards a hand that holds the handheld device and moves to a center position when two hands hold the handheld device.

14. The system of claim 13, further comprising:
   holding the handheld device with the left hand and typing on the keyboard with a left thumb;
   holding the handheld device with the right hand and typing on the keyboard with a right thumb; or
   holding the handheld device with two hands and typing on the keyboard with the left thumb and the right thumb.

15. The system of claim 12, wherein detecting the one or more sensory touches comprises determining a majority of the one or more sensory touches over an interval from the left hand, the right hand, and the two hands.

16. The system of claim 15, wherein changing the location of the keyboard comprises changing the location of the keyboard based on the majority of the one or more sensory touches.

17. The system of claim 13, wherein detecting the one or more sensory touches comprises determining a majority of the one or more sensory touches over an interval from the left hand, the right hand, and the two hands and wherein changing the location of the keyboard comprises changing the location of the keyboard based on the majority of the one or more sensory touches.

18. The system of claim 17, wherein changing the location of the keyboard based on the majority of the one or more sensory touches comprises implementing an algorithm to record keystroke attempts.

* * * * *